United States Patent [19]
Tantam

[11] 3,913,776
[45] Oct. 21, 1975

[54] VACUUM-INSULATED VESSEL

[75] Inventor: Donald Harry Tantam, London, England

[73] Assignee: The British Oxygen Company Limited, London, England

[22] Filed: Mar. 23, 1973

[21] Appl. No.: 344,267

[52] U.S. Cl.............................. 220/9 C; 215/13 R
[51] Int. Cl.²................ A47J 41/02; B65D 23/02; B65D 23/08
[58] Field of Search........... 220/9 F, 9 C, 9 D, 9 M; 215/13 R; 206/4; 229/1.5 B

[56] References Cited
UNITED STATES PATENTS

| | | | |
|---|---|---|---|
| 1,421,325 | 6/1922 | Walker et al. | 215/13 R |
| 2,649,101 | 8/1953 | Suits | 220/9 C X |
| 2,863,179 | 12/1958 | Gaugler | 220/9 C |
| 2,962,183 | 11/1960 | Rill, Jr. et al. | 220/9 F |
| 3,114,469 | 12/1963 | Francis et al. | 220/9 C |
| 3,696,987 | 10/1972 | Schuff et al. | 229/1.5 B |

FOREIGN PATENTS OR APPLICATIONS

| | | | |
|---|---|---|---|
| 1,112,817 | 8/1961 | Germany | 220/9 C |

*Primary Examiner*—William I. Price
*Assistant Examiner*—Stephen Marcus
*Attorney, Agent, or Firm*—Dennison, Dennison, Townshend & Meserole

[57] ABSTRACT

A strong, easy to fabricate, vacuum insulated vessel formed by disposing an impermeable flexible sheet material about a pre-formed shell and evacuating the space enclosed by the sheet material so as to make it fit the shell closely.

11 Claims, 8 Drawing Figures

VACUUM-INSULATED VESSEL

PRIOR ART

Conventional materials for vacuum-insulated vessels possess a number of disadvantages. Thus stainless steel is both heavy and expensive. Glass is fragile and difficult to form into the desired shape. The invention is concerned with a novel form of vacuum insulated vessel of simplified but strong construction.

SUMMARY OF THE INVENTION

According to the invention there is provided a vacuum-insulated vessel comprising an insulating shell having, as an interior and exterior lining or a lining and coating, a one-piece layer of impermeable flexible material.

The invention also provides a method of forming a vacuum-insulated vessel wherein an insulating shell is placed within a piece of impermeable flexible material so as to form it into a one-piece lining and coating for the shell.

Preferably at least part of the shell is porous, having interconnected pores to allow thorough evacuation. Additionally or alternatively at least part of the shell can be hollow. Suitable porous materials to be used alone or in a composite shell include expanded polystyrene and certain expanded siliceous materials in thin-walled spheroidal form, that is, made up of spheres fused together. One suitable form of such a siliceous materials is available under the trade name BRELITE. Suitable materials for a hollow shell include aluminium and rigid plastic materials.

One convenient form of composite shell comprises a rigid layer of metal or plastic material having a coextensive coating and/or lining of porous material through which the vacuum is drawn. The shell is given rigidity by the metal or plastic layer and ability to provide vacuum insulation by the porous material. The porous material in such a construction need not itself be rigid. A particularly useful flexible porous material for use in such an assembly is glass-fibre sheet.

In order to assist evacuation it is desirable for the shell to include a tube for connection to a vacuum pump. The tube is preferably located in a recessed portion of the shell. In this way the tube is protected from damage. While the tube can include a non-return valve to permit re-evacuation, this represents an unnecessary complication for many purposes and the tube can instead have a conventional seal.

A getter can be incorporated in or on the shell, for example as a coating or lining or within a hollow portion.

Since it is to be enclosed within a chamber formed by a flexible layer, the shell can be of any desired shape. Thus for example it can be a cylinder with one end closed so as to provide a container for liquids or be an open cylinder for use in pipelines. The openings in such a container or pipeline section can be shaped as desired, for example to fit a particular style and size of cap or connection.

The choice of material for the impermeable flexible layer is extremely important. Many otherwise attractive plastic sheeting materials, for example polyethylene or polyvinyl chloride, do not possess adequate impermeability for most purposes. One particularly suitable material is aluminium-coated polyethylene terephthalate are available under the trade name MELINEX. In vessels having a pump-down tube attached to the shell the tube provides a convenient point to which the ends of the impermeable layer can be attached.

In order to protect the impermeable layer, particularly if the vessel is to be employed for heavy duty work, an outer sheath, preferably of low-thickness material, may be provided for at least a part of the vessel. Examples of suitable materials for the sheath are aluminium and plastic materials. When the sheath has been placed around the vessel the sheath can be shaped to conform closely to the configuration of the vessel. It may be found convenient to provide on the sheath means for connecting the vessel to a cap or to a second vessel.

In construction of the vessel, especially of a container having a single opening, it is convenient to employ the impermeable material in the shape of a sock, to insert the toe into the vessel, to fold the top over the outside of the shell, to gather together the top (over, if provided, a pump down tube in the base) and then to evacuate the space thus enclosed by the sock. The external air pressure ensures a close fitting of the impermeable layer to the shell. Because of the close fit care should be taken to keep the shell free from rough edges or sharp projections. These could produce unduly rapid wear of the impermeable material.

If an outer sheath is employed, it may be found convenient to employ a flexible material for the shell and to place the evacuated shell into a partially formed sheath and to effect the final shaping of the shell and sheath in the same operation.

In fitting the impermeable layer to a portion of pipeline it is generally most convenient to start with the impermeable layer in the form of a tube, to insert one part of the tube through the pipeline and to fold the remainder from both ends over the outer surface so as to permit a seal to be formed on the outer surface. Brief application of heat is normally sufficient to form a seal but if necessary other sealing means such as adhesives can be used.

The invention provides the advantages of simplicity of construction and a vessel better able than prior versions to withstand rough handling.

The invention is illustrated with reference to the accompanying drawings in which FIGS. 1 to 3 each show a sectional view of different forms of shell suitable for use in vessels according to the invention.

Figure 1:
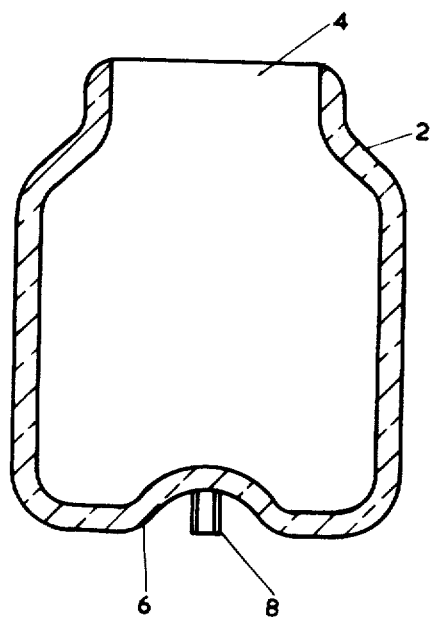
Figure 2:
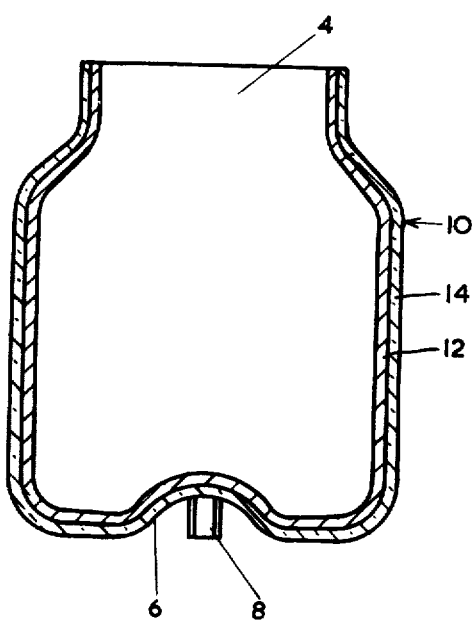
Figure 3:
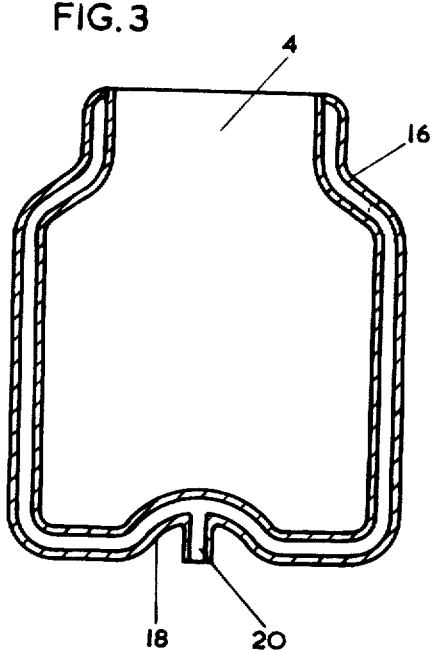

The shell 2 shown in FIG. 1 is of porous insulating material. It has an opening 4 to receive and discharge contents and a recess 6 to accommodate a pump-down tube 8. The shell 10 shown in FIG. 2 is made up of an aluminium layer 12 coated with a porous insulating layer 14 through which the vacuum is drawn and has items 4, 6 and 8 similar to those of shell 2. In FIG. 3 the shell 16 is a hollow structure formed of aluminium. A recess 18 and pump-down tube 20 are formed by suitable shaping of the aluminium.

Figure 4:
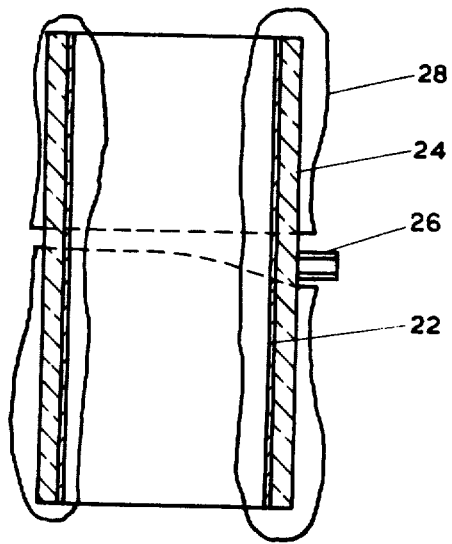
FIG. 4 shows a sectional view of a portion of pipeline with an impermeable layer being placed in position prior to evacuation.

The portion of pipeline in FIG. 4 has an aluminium cylinder 22 with a coating of porous insulating material 24. A pump-down tube 26 is attached to one side of the insulating material 24. A layer of impermeable material 28, initially of generally cylindrical shape is placed inside the cylinder 22 and its ends are folded back outside the insulating coating 24 ready for sealing and evacuation.

Figure 5:
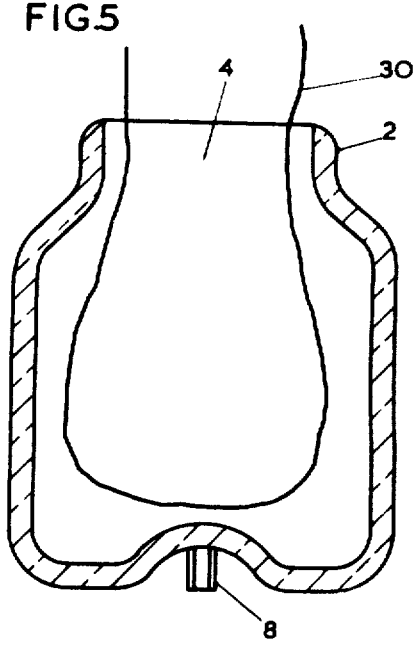
FIGS. 5 to 8 show sectional views of a vessel according to the invention at different stages in its construction.
Figure 6:
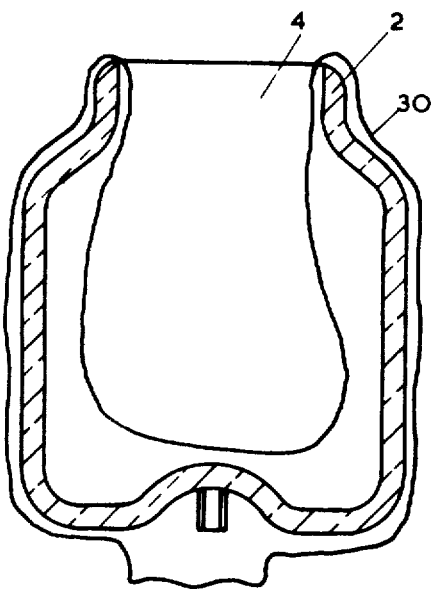
Figure 7:
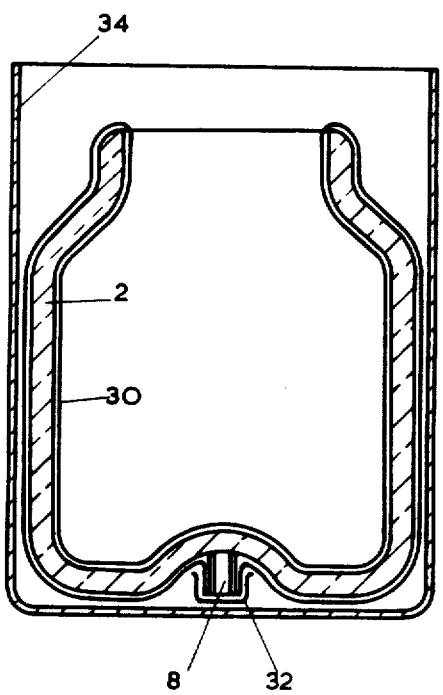
Figure 8:
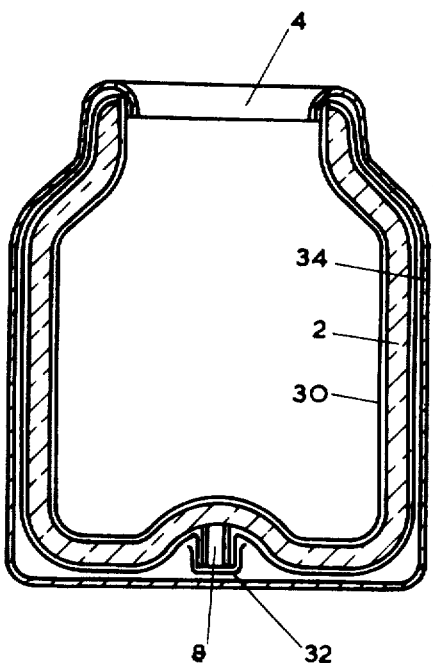

FIG. 5 shows the shell 2 of FIG. 1 with the toe of a sock 30 of impermeable material placed inside the shell. In FIG. 6 the upper part of the sock 30 has been folded back over the outer surface of the shell 2 ready for the open end to be gathered together over the pump-down tube 8 for evacuation of the shell 2. In FIG. 7 the sock 30 has been secured in position by the evacuation and a sealing cap 32 placed over the pump-down tube. The assembly so formed is placed in a sheath 34 of low-thickness aluminium. The upper part of the sheath 34 is then rolled to conform to the shape of the outer surface of the upper part of the shell 2 and finally the uppermost part of the sheath 34 is folded into the opening 4 so as to hold the shell 2 in position and to protect the uppr inner part of the opening 4. The completed assembly is shown in FIG. 8.

We claim:

1. A vacuum-insulated vessel comprising an insulating shell at least partially air-permeable and having as an interior and exterior lining a one-piece layer of impermeable flexible material sealed about the shell, said flexible material defining a closed chamber containing said shell and within which a vacuum is drawn through said shell, said shell comprising a rigid layer of plastic material having inner and outer surfaces and a layer of porous material covering one of said surfaces.

2. A vessel as claimed in claim 1, wherein a getter is incorporated in the chamber.

3. A vessel as claimed in claim 1, wherein the impermeable flexible material is aluminium-coated polyethylene terephthalate sheet.

4. A vessel as claimed in claim 1 wherein the layer of impermeable flexible material is pre-formed.

5. A vessel as claimed in claim 1, wherein the shell includes a tube attached thereto for connection to a vacuum pump.

6. A vessel as claimed in claim 5, wherein the shell includes a recessed portion, said tube being located in the recessed portion of the shell.

7. A vacuum-insulated vessel comprising an insulating shell at least partially air-permeable and having as an interior and exterior lining a one-piece layer of impermeable flexible material sealed about the shell, said flexible material defining a closed chamber containing said shell and within which a vacuum is drawn through said shell, and an outer sheath provided for at least a part of the vessel.

8. A vessel as claimed in claim 7, wherein the shell is formed of expanded polystyrene.

9. A vessel as claimed in claim 5, wherein means are provided on the sheath means for connecting the vessel to another member.

10. A vessel as claimed in claim 5, wherein the shell is formed of an expanded siliceous material in thin-walled spheroidal form.

11. A vacuum-insulated vessel comprising an insulating shell of air-permeable material having as an interior and exterior lining a one-piece layer of pre-formed impermeable flexible material, a tube attached to the shell, the ends of the one-piece layer of impermeable flexible material being gathered around the tube to define a closed chamber containing said shell and within which air can be removed from the chamber and shell by applying a vacuum pump to the tube.

* * * * *